July 17, 1962  B. F. MADSEN  3,044,590

FRICTION TYPE CLUTCH

Filed Sept. 30, 1959  2 Sheets-Sheet 1

INVENTOR
BERTHEL F. MADSEN
BY *R. C. Terry*
ATTORNEY

INVENTOR
BERTHEL F. MADSEN

United States Patent Office 3,044,590
Patented July 17, 1962

3,044,590
FRICTION TYPE CLUTCH
Berthel F. Madsen, Arlington Heights, Ill., assignor to Teletype Corporation, Chicago, Ill., a corporation of Delaware
Filed Sept. 30, 1959, Ser. No. 843,401
8 Claims. (Cl. 192—26)

This invention relates to friction clutches and more particularly to friction clutches of the type wherein wedging members are wedged between the driven and driving members of the clutch to apply driving torque from the driving to the driven member.

It is an object of the present invention to provide a simple positive acting clutch mechanism which comprises a minimum number of parts.

Another object of the invention is the provision of a clutch mechanism which is positive in action and which comprises a minimum number of easily manufactured parts.

In accordance with one embodiment of the invention, a clutch is provided which consists of a drum or driving member for connection to a driven member wherein at least two wedging members are spring urged to a position where they are wedged between the interior surface of the driving member or drum and a surface of the driven member by a spring which urges the wedges to move to a wedging position by moving in the direction in which the driving member or drum is moving but which relieves pressure on the wedges when the lever itself is blocked from moving in said direction.

The wedge members may either comprise slidable wedging members which wedge between the interior of the drum and the driven member or they may comprise pivotal members which in pivoting are wedged between a surface of the driven member and the interior of the drum. Furthermore, the spring means which tend to move the wedges into wedging engagement with the drum or driving member may comprise either coil springs or clock type springs.

A more complete understanding of the invention may be had by reference to the following detailed description when considered in conjunction with the accompanying drawings wherein.

Figure 1:
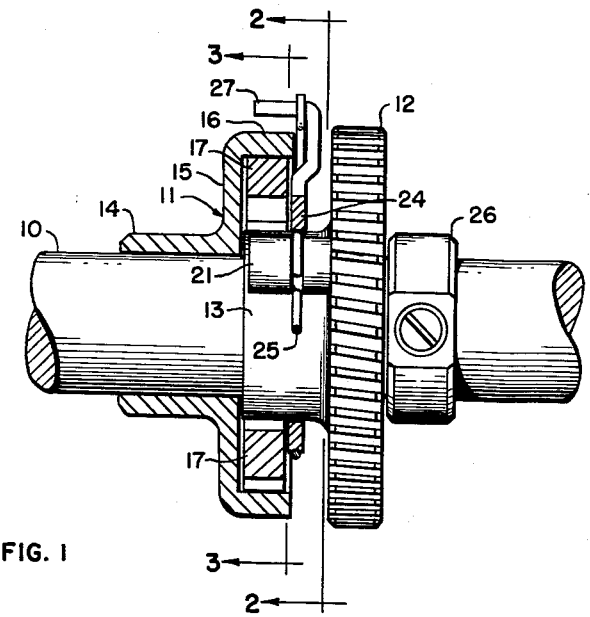
FIG. 1 is a longitudinal sectional view through a clutch mechanism embodying the features of the present invention and showing the arrangement of the driving shaft, driving drum or driving member and driven member.
Figures 2, 3:
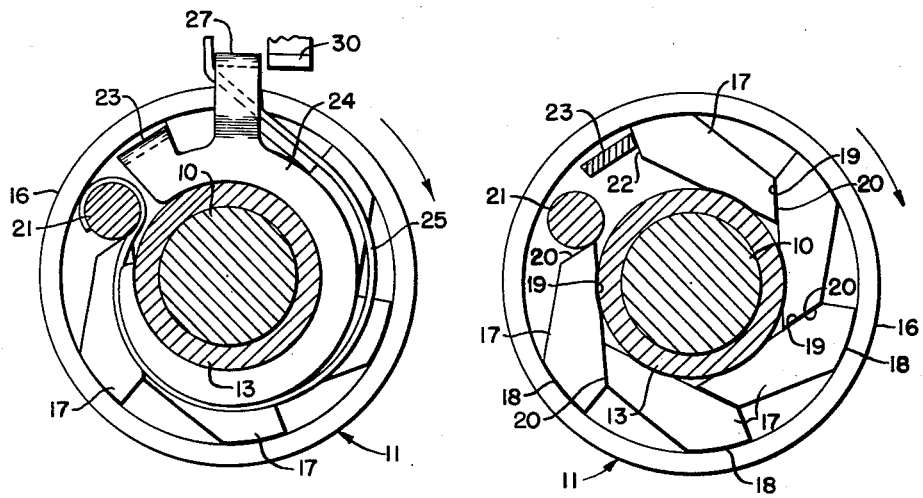
FIG. 2 is a transverse vertical sectional view taken substantially along the line 2—2 of FIG. 1 in the direction of the arrows.
FIG. 3 is a transverse sectional view taken substantially along the line 3—3 of FIG. 1 in the direction of the arrows showing the arrangement of wedging members which engage the drum.

Referring now to the drawings wherein like reference characters designate the same parts through the several views, particular reference being first had to FIGS. 1 to 3, inclusive, it will be seen that the clutch mechanism includes a constantly rotating power shaft 10 to which there is fixed a driving member or drum 11. The driven member of the clutch is illustrated as a gear 12 which may drive any mechanism to which power is to be supplied.

The gear 12 is formed integrally with a sleeve portion 13 freely rotatable on the shaft 10.

The driving member or drum 11 comprises a shaft engaging cylindrical portion 14 formed integrally with disk 15 which is also formed integrally with an annular drum portion 16. The sleeve 13 extends into the drum portion 16 and is formed integrally with the gear 12. Positioned about the periphery of the sleeve portion 13 are a plurality of wedging members 17. The wedging members 17 are irregularly formed as shown in FIG. 3 to provide a tapered configuration such that each of them has a surface 18 that is arranged to engage the inner surface of the drum portion 16, a surface 19 which may rest on the sleeve 13 and a surface 20 which is arranged to be engaged by the surface 19 of the next adjacent wedging member 17.

In the embodiment of the invention disclosed in FIGS. 1 to 3, there are five wedging members 17 provided and these wedging members are arranged about the interior of the drum 16 and exterior surface of the sleeve 13 in such a manner that the surfaces 20 of four of the wedging members 17 engage the surfaces 19 of the next adjacent four wedging members 17 and the surface 20 of the fifth wedging member 17 engages a pin 21 extending outwardly (to the left as seen in FIG. 1) from the face of the gear 12. The wedging members 17 are all of the same construction and a surface 22 on one of the wedging members 17 is positioned to be engaged by a bent over portion 23 of a lever 24 which is oscillatably mounted on the sleeve portion 13. The wedge members 17, a lever 24 and a spring 25 are held in position between the gear 12 and drum 11 by a collar 26, suitably attached on the shaft 10 and bearing against the right face (FIG. 1) of the gear 12.

The lever 24 is urged to move in a clockwise direction (FIGS. 2 and 3) by the clock type spring 25 that is anchored on the pin 21 attached to the gear 12 and bears against a stop arm portion 27 of the lever 24. When the lever 24 is permitted to rock in a clockwise direction, FIGS. 2 and 3, under the influence of the spring 25, the bent-over portion 23 will engage the surface 22 of the wedging member 17 adjacent to it, thus to force the surface 20 of that wedging member against the surface 19 of the next adjacent wedging member 17. Motion will be transmitted through the various wedging members 17 from one to another to force their surfaces 18 outwardly into engagement with the interior surface of the drum 16 and since the wedging members 17 are prevented from moving an appreciable distance in a clockwise direction (FIGS. 2 and 3) due to the engagement of the end of one of them with the pin 21, the wedging members will grip the interior surface of the drum portion 16 and cause the sleeve 13 and gear 12 to rotate with the drum 16. If, however, the lever 24 is blocked from moving in a clockwise direction, for example, by a stop arm 30 (FIG. 2), the spring 25 will be compressed and will relieve the pressure on the wedging members which forced them to engage the interior of the drum 16. Thus, the driven member or gear 12 will be disconnected from the driving member or drum 16.

Figure 4:
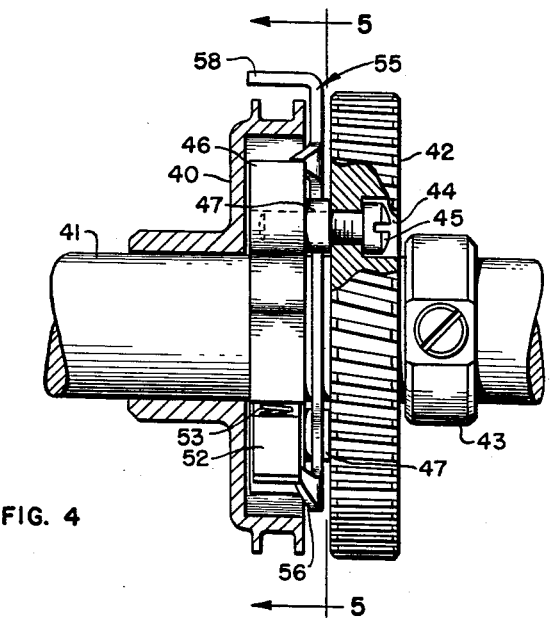
FIG. 4 is a longitudinal sectional view through a clutch mechanism similar to that shown in FIG. 1 but illustrating an alternate embodiment of the invention.
Figures 5, 6:
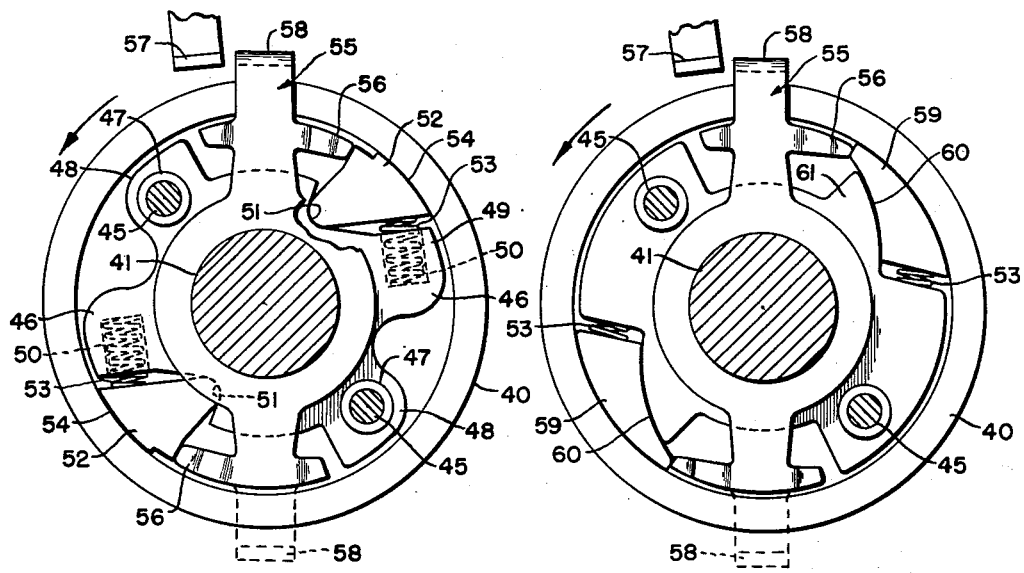
FIG. 5 is a transverse sectional view taken along the line 5—5 of FIG. 4 is the direction of the arrows.
FIG. 6 is a sectional view similar to FIG. 5 and showing an alternate embodiment of the arrangement of wedging members and spring means for biasing the wedging members to engage the drum.

In the embodiment of the invention shown in FIGS. 4 and 5, a driving member or drum 40 is provided which is similar to the drum 16 and this driving member is fixed to a shaft 41 for driving a gear 42 that is freely rotatable with respect to the shaft 41. The gear 42 is held against movement to the right (FIG. 4) on the shaft 41 by a collar 43 suitably attached to the shaft and bearing against right-hand face of the gear 42. The gear 42 has a pair of counterbored apertures 44 formed in it for receiving a pair of mounting screws 45 which are threaded into a rotary member 46 that is freely rotatable on the shaft 41 and is held in spaced relation to the gear 42 by a pair of spacers 47. The rotary member 46 has radially projecting portions 48 into which the mounting screws 45 are threaded and has other radially projecting portions 49 that are drilled tangentially of the axis of the shaft 41 to form spring pockets 50. The rotary member 46 has a pair of wedge seats 51 formed in it for receiving the rounded ends of a pair of wedge members 52. Springs 53 seated in the pockets 50 bear against the wedge members 52 and tend to rock them counterclockwise as viewed in FIG. 5 to force a surface 54 of each member into engagement with the inner surface of the annular portion of the drum 40.

The springs 53 normally tend to force the surface 54 of the wedge members 52 into gripping engagement with the inner surface of the drum 40 to interconnect the rotary member 46 with the driving member or drum 40. However, the wedge members 52 may be disengaged from the inner surface of the drum 40 by a stop lever 55 which is mounted for free rotation on the shaft 41 in a position between the rotary member 46 and the gear 42. The stop lever 55 is provided with a pair of bent portions 56 which are bent out of the main plane of the lever 55 to engage with surfaces of the wedge members 52 when a stop member 57 is moved into the path of a laterally extending arm 58 of the lever 55.

When the shaft 41 is driven in a counterclockwise direction as indicated by the arrow in FIG. 5, the stop member 57 will be engaged by the laterally extending arm 58 of the lever 55 and the bent portions 56 of the lever 55 will rock the wedge members 52 relatively in a clockwise direction in their seats 51 to compress the springs 53 and to disengage the surfaces 54 of the wedge members 52 from the inner surface of the drum 40 to interrupt the rotation of the gear 42 with the shaft 41. The lever 55 may be provided with one laterally extending arm 58 as shown in solid lines in FIG. 5 or may be provided with two of these laterally extending arms as indicated by the dotted lines at the bottom of FIG. 5 whereby the clutch may be disengaged after either a full revolution or a half revolution of the gear 42 with the shaft 41. When the stop member 57 is withdrawn from the path of the laterally extending arm 58 of stop lever 55, the springs 53 will be able to rock the stop lever 55 a short distance thereby to rock the wedge members 52 in their wedge seats 51 to effect a wedging engagement between the wedge members 52 and the drum 40.

The embodiment of the invention disclosed in FIG. 6 is quite similar to that shown in FIG. 5 and where the parts in the embodiment disclosed in FIG. 6 are identical with those parts in FIG. 5, the same reference numerals have been applied in FIG. 6 as were applied in FIG. 5. In the embodiment of the invention shown in FIG. 6, wedge members 59 are provided and these wedge members are slidable on a camming surface 60 formed on a rotary member 61 which has springs 53 seated in it for urging the wedge members 59 into engagement with the inner surfaces of the drum 40. In the operation of the apparatus shown in FIG. 6, the stop lever 57 normally is in the path of the laterally extending arm 58 of the stop lever 55 and when it is so positioned, the bent portion 56 of the stop lever 55 will prevent the wedge members 59 from continuing to move with the drum 40, thus to compress the springs 53 and disengage the wedge members 59 from the drum 40. When the stop member 57 is removed from the path of the laterally extending arm 58 of the stop lever 55, the springs 53 will move the wedge members 59 up the camming surfaces 60 of the rotary members 61 to wedge the wedge members between the camming surface 60 and the inner annular surface of the drum 40 thus to interconnect the rotary member 61, and consequently the gear 42, with the shaft 41.

Although a specific embodiment of the invention has been described hereinbefore, it should be understood that numerous variations thereof may be employed without departing from the invention.

What is claimed is:
1. A clutch consisting of a driving drum having an interior surface, a driven member arranged within said driving drum and concentric with said driving drum, at least two wedging members having surfaces conforming to the interior surface of said driving drum, said wedging members being interpositioned between said driving drum and said driven member and movable into wedging engagement with said driving drum and driven member to connect drivingly said driving drum and said driven member, a spring for urging said wedging members into contact with said driving drum, a lever carried by said driven member operable to release said wedging members from wedging engagement with said drum, and means movable into the path of movement of said lever to block movement of said lever thereby to release said wedging members from wedging engagement with said drum.

2. A clutch consisting of a driving member, a member arranged to be driven by said driving member, a plurality of tapered wedging members carried by said driven member for connecting said driving member to said driven member, resilient means for urging said wedging members to a position for connecting said driving and driven members, a lever rotatable with said driven member for compressing said resilient means to disengage the wedging members from the driving member, and means interposable in the path of said lever for actuating it to compress said resilient means.

3. A clutch mechanism consisting of a drum having an interior surface, a shaft fixed to said drum for rotating said drum, a sleeve mounted for free rotation with respect to said shaft and extending into said drum, wedging members carried by said sleeve within said drum for wedging engagement with the interior surface of said drum and comprising the sole driving connection between said drum and said sleeve, a spring for urging said wedging members to engage said drum, a lever normally rotatable with said driven member and freely rotatable with respect to said shaft, and means for imparting relative movement to said lever with respect to said driven member to compress said spring and disengage said wedging members from said driven member.

4. A clutch consisting of a driving member, a member arranged to be driven by said driving member, a plurality of wedging members disposed within the driving member and comprising the sole driving connection between said driving member and said driven member, a spring biased to force said wedging members into wedging engagement one with the other and into wedging engagement with the driving member and driven member, a lever rotatable with said driven member for compressing said spring to disengage the wedging members from the driving member, and means interposable in the path of said lever for actuating it to compress said spring.

5. A clutch consisting of a driving drum having an interior surface fixed to a continuously rotating shaft, a driven member to be driven by said drum, a stop lever oscillatable with respect to said driven member and rotatable with said driven member, wedging members having a drum engaging surface conforming substantially to the interior surface of the drum and movable to wedging engagement between said driven member and said drum, spring means for urging said wedging members to wedging relation with the driven member and drum, and a stop member interposable in the path of said stop lever for blocking movement of the stop lever to cause it to oscillate with respect to the driven member thereby to disengage the wedging members from wedging relation with the drum.

6. A clutch comprising a drum fixed to a continuously rotating shaft, a driven member freely rotatable with respect to said shaft, a sleeve on said driven member extending into said drum, a plurality of tapered wedging members interposed between the outer surface of said sleeve and the inner surface of said drum, a lever mounted for oscillation with respect to said sleeve and having a portion of it disposed to engage with one of said wedging members, spring means for urging said lever to engagement with said one wedging member to apply force to said one wedging member and through said one wedging member to the other wedging members to cause them to move to wedging engagement with the interior of the drum, and a stop member interposable in the path of said lever to impart movement to said lever relative to said driven member to disengage said portion of said lever from said one wedging member.

7. A clutch consisting of a drum, a shaft attached to said drum for driving it continuously, a stop lever mounted on said shaft for relative rotation with respect thereto, a driven member having a plurality of wedge receiving notches in it, a wedging member pivotally supported in each of said notches, a spring individual to each wedging member and seated in said driven member for urging the wedging members to wedging engagement with the interior surface of the drum, bent portions on said stop lever for engagement with each of said wedging members to rock them with respect to the driven member against the action of said springs, and a stop member movable into the path of said stop lever to rock the stop lever with respect to the driven member thereby to effect disengagement of said wedging members from the surface of said drum.

8. A clutch consisting of a drum fixed to a continuously rotating shaft, a stop lever mounted on said shaft for relative rotation with respect thereto, a driven member having a plurality of camming surfaces on it, wedging members for cooperation with the camming surfaces on the driven member, a spring individual to each wedging member for urging its associated wedging member to move with respect to its associated camming surface and into wedging engagement with the interior surface of the drum, bent portions on said stop lever for engagement with each of said wedging members to rock them with respect to the driven member against the action of said springs, and a stop member movable into the path of said stop lever to rock the stop lever with respect to the driven member, thereby to effect disengagement of said wedging members from the surface of said drum.

References Cited in the file of this patent

UNITED STATES PATENTS

| | | |
|---|---|---|
| 1,090,444 | Barnard | Mar. 17, 1914 |
| 1,256,755 | White | Feb. 19, 1918 |
| 1,874,896 | Campbell | Aug. 30, 1932 |
| 2,501,408 | Robin | Mar. 21, 1950 |
| 2,624,434 | De Boo et al. | Jan. 6, 1953 |
| 2,735,525 | Martindell | Feb. 21, 1956 |
| 2,855,785 | Rutishauses | Oct. 14, 1958 |

FOREIGN PATENTS

| | | |
|---|---|---|
| 434,218 | Great Britain | Aug. 28, 1935 |